United States Patent Office 2,796,786
Patented June 25, 1957

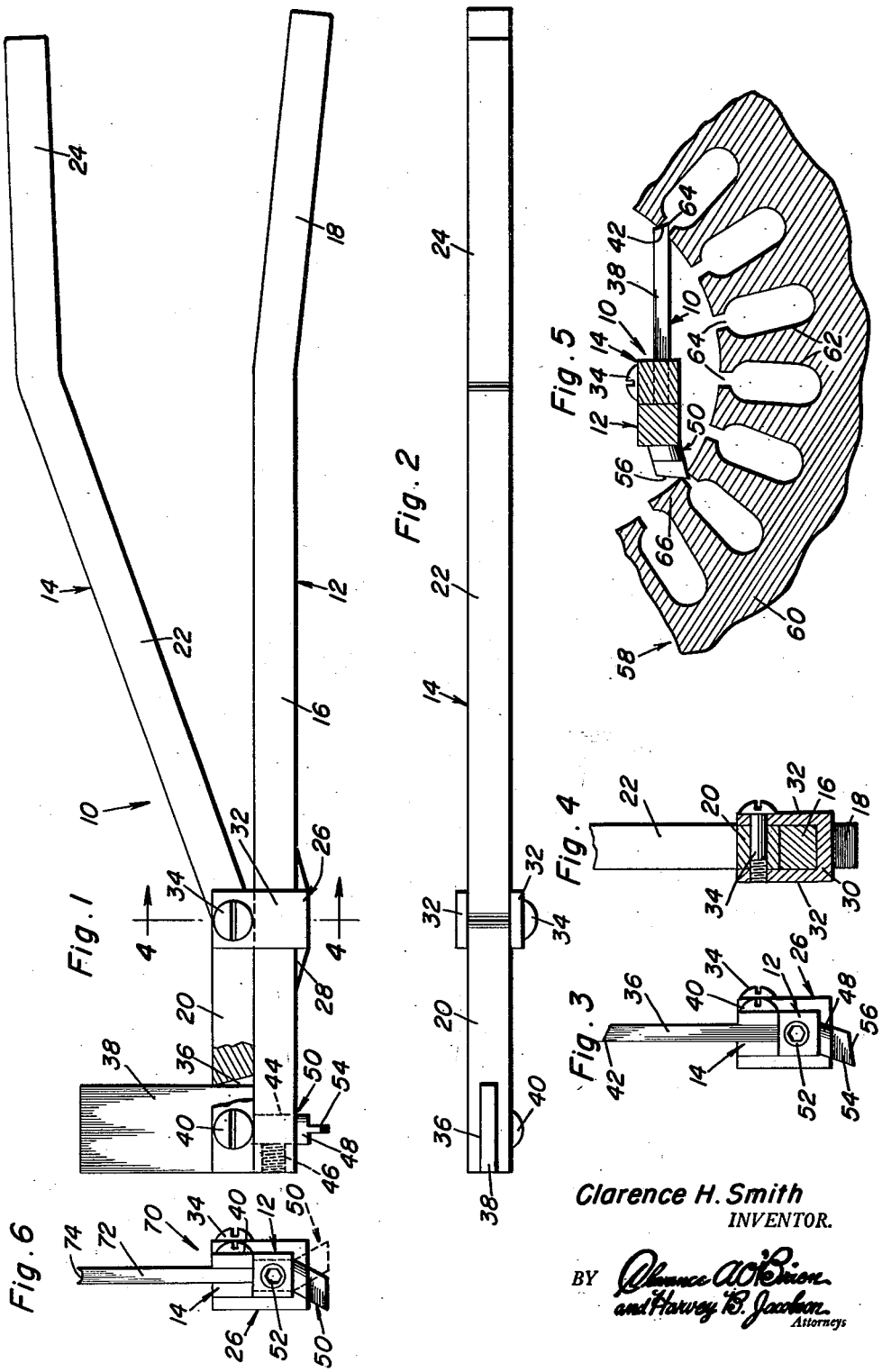

2,796,786
ELECTRIC MOTOR REPAIR TOOL
Clarence H. Smith, Shelby, Ohio

Application February 27, 1956, Serial No. 567,933

7 Claims. (Cl. 81—15)

This invention relates in general to new and useful improvements in hand tools, and more specifically to an improved repair tool for electric motors.

The stator of an electric motor is formed of a plurality of laminations. These laminations have aligned recesses therein for receiving windings, the recesses having relatively narrow entrance openings for the windings. Under certain conditions the individual laminations become bent thereby making it both difficult to remove and replace windings and at the same time loosening the means normally holding the windings in place. It is therefore necessary in the repair of an electric motor to straighten the laminations.

It is therefore the primary object of this invention to provide a repair tool for electric motors which is specifically designed for use in straightening laminations of stators of electric motors.

Another object of this invention is to provide an improved repair tool for laminations of electric motor stators, the repair tool including a pair of levers one of which has an anvil attached thereto and the other a work tool, the anvil engaging a plurality of laminations and forming a suitable backing for the tool and the work tool engaging a single lamination and straightening it as desired.

A further object of this invention is to provide an improved repair tool for straightening laminations of an electric motor, the repair tool including a work tool which is reversible whereby the repair tool may be utilized under varying conditions for the straightening of individual laminations of an electric motor stator or similar parts.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a plan view of the repair tool which is the subject of this invention and shows the general details thereof, an end part of one of the levers of the repair tool being partially broken away and shown in section in order to clearly illustrate the pivotal mounting of an anvil carried thereby;

Figure 2 is a side elevational view of the repair tool of Figure 1 and shows further the relationship of the anvil with respect to the one lever;

Figure 3 is an end view of the repair tool of Figure 1 and shows the particular relationship between the anvil and a work tool carried by the other of the levers;

Figure 4 is a transverse vertical sectional view taken substantially upon the plane indicated by the section line 4—4 of Figure 1 and shows the manner in which the levers are pivotally connected to each other;

Figure 5 is a fragmentary sectional view taken through a stator of an electric motor with the windings thereof removed and shows the repair tool in use straightening a lamination of the stator; and Figure 6 is an end view of a slightly modified form of repair tool, an alternative position of the work tool thereof being shown by dotted lines.

Referring now to the drawing, it will be seen that there is illustrated the electric motor repair tool, which is the subject of this invention, which is referred to in general by the reference numeral 10. The repair tool 10 includes a pair of levers 12 and 14. The lever 12 includes an elongated straight portion 16 which terminates at its rear end in a handle portion 18. The lever 14 includes a forward straight portion 20, an intermediate straight portion 22 which diverges away from the straight portion 16 and a rear handle portion 24.

In order that the levers 12 and 14 may be pivotally connected together, there is carried by a forward part of the straight portion 16 a U-shaped fitting 26. The fitting 26 includes a rib portion 28 which is suitably welded to the lever 12, the rib portion 28 being formed integrally with what may be considered a web 30 of the fitting 26. The fitting 26 also includes a pair of flanges 32 which are disposed on opposite sides of the straight portion 16 and the forward straight portion 20. Carried by the flanges 32 is a pivot bolt 34 on which the lever 14 is pivotally mounted.

The forward end of the forward portion 20 is provided with a central slot 36 in which there is seated one end of an anvil 38. The anvil 38 is in the form of a flat plate having an elongated rectangular outline, there being passed through the anvil member 38 a pivot bolt 40 carried by the forward portion 20. As is best illustrated in Figure 1, the slot 36 is of a size to permit limited pivoting of the anvil 38. The edge of the anvil 38 remote from the lever 14 is beveled as at 42 to permit proper engagement with an electric motor stator.

Formed in the forward end of the straight portion 16 is a bore 44 whose axis is normal to the axis of the bolt 40 and which intersects the axis of the pivot bolt 40. Formed in the extreme end of the lever 12 is a bore 46 which is normal to the bore 44 and which intersects the bore 44.

Seated in the bore 44 is a shank portion 48 of a work tool 50. The shank 48 is retained in position with respect to the lever 12 by a set screw 52 threadedly engaged in the threaded bore 46. The work tool 50 also includes a blade 54 which terminates in an offset lamination engaging edge 56 which is disposed generally normal to the plane of the levers 12 and 14.

Referring now to Figure 5 in particular, it will be seen that there is illustrated a fragmentary portion of an electric motor stator, which is referred to in general by the reference numeral 58. The stator 58 is formed of a plurality of laminations 60 which have aligned winding receiving recesses 62. The winding receiving recesses 62 are provided with narrow entrance openings 64.

At times the individual laminations 60 become bent, particularly in the vicinity of the entrance openings 64 so as to prevent the entrance or removal of wires of the windings, or at times the movement of relative parts of the electric motor. The repair tool 10 is specifically designed for straightening the individual laminations 60 in the vicinity of the entrance openings 64. In Figure 5 a portion of the lamination 60 is illustrated as being bent as at 66. In order to straighten the bent portion 66 of a lamination 60, the tool 10 must be placed within the general confines of the stator 58, as is best illustrated in Figure 5.

When the repair tool 10 is properly positioned, the anvil member 38 has the edge thereof remote from the lever 14 positioned in one of the entrance openings 64 and engaging a plurality of the laminations 60 due to the relatively wide width of the anvil 38. The beveled edge 42 facilitates the entrance of the edge of the anvil 38 into the one entrance opening. The repair tool 10 is so aligned with the bent portion 66 that the work engaging edge 56 thereof engages the bent portion 66. Then by squeezing on the handle portions 18 and 24, the work tool 50 is advanced towards the bent portion 66 so as to straighten it. Inasmuch as the work engaging edge 56 has a width equal to the width of a single lamination 60, it will be readily apparent that one lamination at a time may be straightened as desired.

Referring now to Figure 6 in particular, it will be seen that there is illustrated a slightly modified form of repair tool which is referred to in general by the reference numeral 70. The repair tool 70 includes a modified form of anvil 72, the anvil 72 having a U-shaped recess 74 in the free edge thereof to form a double beveled edge. Also, the work tool 50 is mounted in the lever 12 whereby when the set screw 52 is loosened, the work tool 50 may be reversed 180° from its position to assume the dotted line position. Thus the work tool 70 may be readily inverted from the position illustrated in Figure 5 to permit all types of bends in the laminations 69 to be straightened. The repair tool 70 is otherwise identical with the repair tool 10.

Although it has not been illustrated, if it is so desired, a spring may be placed between the levers 12 and 14. Such a spring would require a slight additional pressure on the levers 12 and 14 to operate the repair tool 10, but at the same time would provide a desired reactive force against the gripping of the handle portions 18 and 24, such force being highly desirable under certain circumstances.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. An electric motor repair tool for straightening laminations of a stator having a plurality of winding receiving recesses with entrance openings, said tool comprising first and second levers, means pivotally connecting intermediate portions of said levers, an anvil member carried by one of said levers for seating engagement in one of the entrance openings, and a lamination engaging and straightening work tool carried by the other of said levers.

2. An electric motor repair tool for straightening laminations of a stator having a plurality of winding receiving recesses with entrance openings, said tool comprising first and second levers, means pivotally connecting intermediate portions of said levers, an anvil member carried by one of said levers for seating engagement in one of the entrance openings, and a lamination engaging and straightening work tool carried by the other of said levers, said anvil member lying generally in the plane of said one lever, said work tool having a lamination engaging edge disposed normal to the plane of said other lever.

3. An electric motor repair tool for straightening laminations of a stator having a plurality of winding receiving recesses with entrance openings, said tool comprising first and second levers, means pivotally connecting intermediate portions of said levers, an anvil member carried by one of said levers for seating engagement in one of the entrance openings, and a lamination engaging and straightening work tool carried by the other of said levers, said anvil member being mounted for limited pivoting relative to said one lever to insure proper seating of said anvil.

4. An electric motor repair tool for straightening laminations of a stator having a plurality of winding receiving recesses with entrance openings, said tool comprising first and second levers, means pivotally connecting intermediate portions of said levers, an anvil member carried by one of said levers for seating engagement in one of the entrance openings, and a lamination engaging and straightening work tool carried by the other of said levers, said anvil member lying generally in the plane of said one lever, said work tool having a lamination engaging edge disposed normal to the plane of said other lever, said anvil member being mounted for limited pivoting relative to said one lever to insure proper seating of said anvil.

5. An electric motor repair tool for straightening laminations of a stator having a plurality of winding receiving recesses with entrance openings, said tool comprising first and second levers, means pivotally connecting intermediate portions of said levers, an anvil member carried by one of said levers for seating engagement in one of the entrance openings, and a lamination engaging and straightening work tool carried by the other of said levers, said anvil having a beveled edge to insure proper seating in one of the entrance openings.

6. An electric motor repair tool for straightening laminations of a stator having a plurality of winding receiving recesses with entrance openings, said tool comprising first and second levers, means pivotally connecting intermediate portions of said levers, an anvil member carried by one of said levers for seating engagement in one of the entrance openings, and a lamination engaging and straightening work tool carried by the other of said levers, said work tool having an offset lamination engaging edge, said work tool being rotatably mounted in said other lever so as to be reversible.

7. An electric motor repair tool for straightening laminations of a stator having a plurality of winding receiving recesses with entrance openings, said tool comprising first and second levers, means pivotally connecting intermediate portions of said levers, an anvil member carried by one of said levers for seating engaging in one of the entrance openings, and a lamination engaging and straightening work tool carried by the other of said levers, said anvil member lying generally in the plane of said one lever, said work tool having a lamination engaging edge disposed normal to the plane of said other lever, said work tool having an offset lamination engaging edge, said work tool being rotatably mounted in said other lever so as to be reversible.

References Cited in the file of this patent

UNITED STATES PATENTS

| | | |
|---|---|---|
| 1,122,165 | Schoening | Dec. 22, 1914 |
| 1,557,370 | Lane | Oct. 13, 1925 |
| 1,683,261 | Poole | Sept. 4, 1928 |
| 1,737,084 | Hilstad | Nov. 26, 1929 |